United States Patent
Wang (10) Patent No.: US 12,384,563 B1
(45) Date of Patent: Aug. 12, 2025

(54) ELECTRON PROPULSION ENGINE AND METHOD OF OPERATION THEREOF

(71) Applicant: Yong Wang, Vancouver (CA)

(72) Inventor: Yong Wang, Vancouver (CA)

( * ) Notice: Subject to any disclaimer, the term of this patent is extended or adjusted under 35 U.S.C. 154(b) by 0 days.

(21) Appl. No.: 19/041,620

(22) Filed: Jan. 30, 2025

Related U.S. Application Data (60) Provisional application No. 63/691,205, filed on Sep. 5, 2024.

(51) Int. Cl.
*B64G 1/40* (2006.01)
*F03H 99/00* (2009.01)

(52) U.S. Cl.
CPC .............. *B64G 1/417* (2023.08); *B64G 1/409* (2013.01); *B64G 1/411* (2023.08); *F03H 99/00* (2013.01)

(58) Field of Classification Search
CPC ........ B64G 1/409; B64G 1/411; B64G 1/417; F03H 3/00
See application file for complete search history.

(56) References Cited

U.S. PATENT DOCUMENTS

| | | | |
|---|---|---|---|
| D323,446 S | 1/1992 | Morse | |
| 5,197,279 A | 3/1993 | Taylor | |
| 10,006,446 B2 * | 6/2018 | Purvis | F03H 99/00 |
| 11,961,666 B2 * | 4/2024 | Purvis | B64G 1/425 |
| 2019/0084695 A1 | 3/2019 | Ensle | |

* cited by examiner

*Primary Examiner* — Kyle Robert Thomas (57) ABSTRACT

An electron propulsion engine utilizes the acceleration of electrons to propel a spacecraft through space. The acceleration of the electrons in space emits electromagnetic radiation which can be used to propel the spacecraft. The radiation emission also decelerates the electrons, which allows the decelerated electrons to be recycled for reuse by the electron propulsion engine. The electron propulsion engine includes a first engine module, a second engine module, and an engine control system. The first engine module and the second engine module correspond to two mirror structures that form the electron propulsion engine. The engine control system facilitates the automatic control of the operation of the electron propulsion engine. The first engine module and the second engine module each includes a vacuum housing. The vacuum housing of each engine module is a D-shaped structure that facilitates the acceleration of the electrons and the resulting radiation emission to propel the spacecraft.

14 Claims, 9 Drawing Sheets

(A) providing a first engine module and a second engine module, wherein the first engine module and the second engine module each includes a vacuum housing with an electron inlet, a first straight section, a radiation-emission section, a second straight section, and an electron-return section, and wherein the vacuum housing of the second engine module is vertically symmetric to the vacuum housing of the first engine module across a mirror axis.

↓

(B) Providing the first engine module and the second engine module each with an electron gun, an electron accelerator, and an electron decelerator.

↓

(C) Injecting a plurality of electron pulses into the vacuum housing through the electron inlet using the corresponding electron gun.

↓

(D) Accelerating the injected electron pulses along the first straight section using the corresponding electron accelerator.

ELECTRON PROPULSION ENGINE AND METHOD OF OPERATION THEREOF

FIELD OF THE INVENTION

The present invention relates generally to propulsion systems and space vehicles. More specifically, the present invention discloses a novel electron propulsion engine for spacecraft that utilizes the acceleration of charged particles in space for the propulsion of the corresponding spacecraft.

BACKGROUND OF THE INVENTION

Different propulsion systems have been developed to propel various vehicles in different environments. In general, most propulsion engines implement a type of combustion mechanism that utilizes fuel and oxidants to propel the corresponding vehicle. The fuel reacts with the oxidant inside a combustion chamber of the propulsion engine to combust. The combustion output is released in a controlled manner to generate momentum towards the desired direction, which in turn propels the vehicle. This traditional design of combustion propulsion engines has been utilized for many years and has successfully been implemented in many spacecrafts. However, this design of combustion engines has many disadvantages. The combustion process involves using the reactants and expelling the products to propel the spacecraft, which means that the propulsion engine can operate until the fuel/oxidant is fully spent.

This limitation is often the major design limitation of spacecraft, since large amounts of fuel/oxidant is necessary to propel a much lower amount of payload. To solve this limitation, different propulsion engines have been developed for spacecraft that utilize different types of "fuel" to drive the propulsion engine. One of the most promising and popular alternatives is the use of electric power to drive electric propulsion engines. Unfortunately, most of the currently available electric engines have limited functionality that prevents the implementation of electric engines in a wide range of spacecraft. Most current electric propulsion engines cannot generate the thrust necessary to lift the necessary payload. Therefore, a more efficient and reliable electric propulsion engine for spacecraft is necessary.

SUMMARY OF THE INVENTION

The present invention discloses a novel electron propulsion engine for spacecraft. The electron propulsion engine of the present invention works based on the phenomena of accelerated charged particles in space. When negatively charged particles (electrons) are accelerated in space, the accelerating electrons emit electromagnetic waves into space which in turn causes the electrons to lose momentum. Electrons have unit negative charge and minimal mass, which allows electrons to be accelerated to radiate electromagnetic waves and lose momentum at the same time. In addition, decelerating electrons can be reused, which vastly reduces the loss of "fuel" that drives the electron propulsion engine. The present invention creates a condition that lets electrons emit electromagnetic waves and partially lose momentum so that the whole system keeps the opposite momentum. Further, the present invention balances rotational momentum resulting from the acceleration/deceleration of electrons by implementing a symmetric configuration of two electric engines that operate simultaneously. Additional features and benefits of the present invention are further discussed in the sections below.

DETAIL DESCRIPTIONS OF THE INVENTION

All illustrations of the drawings are for the purpose of describing selected versions of the present invention and are not intended to limit the scope of the present invention.

The present invention discloses an electron propulsion engine that utilizes the acceleration of negatively charged particles to propel a spacecraft through space. The acceleration of the negatively charged particles in space emits electromagnetic radiation into space which changes the momentum of the spacecraft that propels the spacecraft in the desired direction. The emission of electromagnetic radiation also decelerates the negatively charged particles, which allows the decelerated particles to be recycled to be reused by the electron propulsion engine. As a result, the present invention removes the current limitations of spacecraft that is dictated by the necessary fuel that needs to be carried along to propel the spacecraft. Further, depending on the speed of the particle acceleration, different modes of radiation can be achieved. If the electron beam is accelerated to lower speeds, electromagnetic waves can be emitted, which makes the electron propulsion engine an electromagnetic wave engine. Alternatively, when the electron beam is accelerated to a high speed (e.g., near the speed of light), Synchrotron radiation could be achieved, which makes the electron propulsion engine a Photon engine. The preferred working mode of the electron propulsion engine of the present invention emits Photon radiation.

In the preferred embodiment, the present invention comprises a first engine module 1, a second engine module 2, and an engine control system 16, as can be seen in FIG. 1 through 6. The first engine module 1 and the second engine module 2 correspond to two mirror structures that form the electron propulsion engine of the present invention. The engine control system 16 facilitates the automatic control of the operation of the electron propulsion engine. Further, the first engine module 1 and the second engine module 2 each comprises a vacuum housing 3. The vacuum housing 3 of each engine module corresponds to a D-shaped structure designed to facilitate the emission of radiation to propel the spacecraft. The vacuum housing 3 preferably has a cross-sectional tubular design of different shapes including, but not limited to, round or rectangular cross-sectional shapes.

Due to the D-shaped design, the vacuum housing 3 comprises an electron inlet 4, a first straight section 5, a radiation-emission section 6, a second straight section 11, and an electron-return section 12, as can be seen in FIG. 1 through 6. The electron inlet 4 corresponds to the section of each vacuum housing 3 through which electron pulses are injected into the vacuum housing 3. The first straight section 5 corresponds to the section of each vacuum housing 3 along which the electron beam is accelerated. The radiation-emission section 6 corresponds to the section of each vacuum housing 3 that facilitates the emission of the generated radiation. Moreover, the second straight section 11 corresponds to the section of each vacuum housing 3 along which the electron beam is decelerated. Further, the electron-return section 12 enables the recycling of the electron beam after the traveling the vacuum housing 3 and emitting the necessary radiation for propulsion of the spacecraft. Furthermore, the electron-return section 12 is an arc-shaped structure that facilitates the recycling of the used electron beam.

In the preferred embodiment, the present invention can be arranged as follows: the vacuum housing 3 of the first engine module 1 and the vacuum housing 3 of the second engine section are positioned coplanar and offset to each other due to the mirrored design of the present invention, as can be seen in FIG. 1 through 6. The first straight section 5 and the second straight section 11 are positioned parallel and offset to each other according to the overall width of the corresponding vacuum housing 3. Further, the radiation-emission section 6 is terminally connected in between the first straight section 5 and the second straight section 11 so that the first straight section 5 is connected to the second straight section 11 via the radiation-emission section 6. Moreover, the electron-return section 12 is terminally connected in between the first conduit section and the second conduit section, opposite the radiation-emission section 6. The first straight section 5 is also connected to the second straight section 11 via the electron-return section 12 on the opposite side. Thus, a closed loop is formed for the vacuum housing 3 of each engine module.

In addition, the electron inlet 4 is terminally integrated into the first conduit section, adjacent to the electron-return section 12 to enable the injection of electron pulses into the corresponding vacuum housing 3, as can be seen in FIG. 1 through 6. Further, the radiation-emission section 6 of the first engine module 1 is positioned adjacent to the radiation-emission section 6 of the second engine module 2 due to the mirror structure of the present invention. Furthermore, the engine control system 16 is positioned external to the first engine module 1 and the second engine module 2 to monitor the operation of the present invention. The engine control system 16 can be an integral system of the spacecraft equipped with the present invention. Alternatively, the engine control system 16 can be a separate system from the spacecraft. Furthermore, the first engine module 1 and the second engine module 2 are electrically and electronically connected to the engine control system 16. This way, the engine control system 16 can monitor the operation of the present invention according to predetermined operational configurations.

Figure 1:
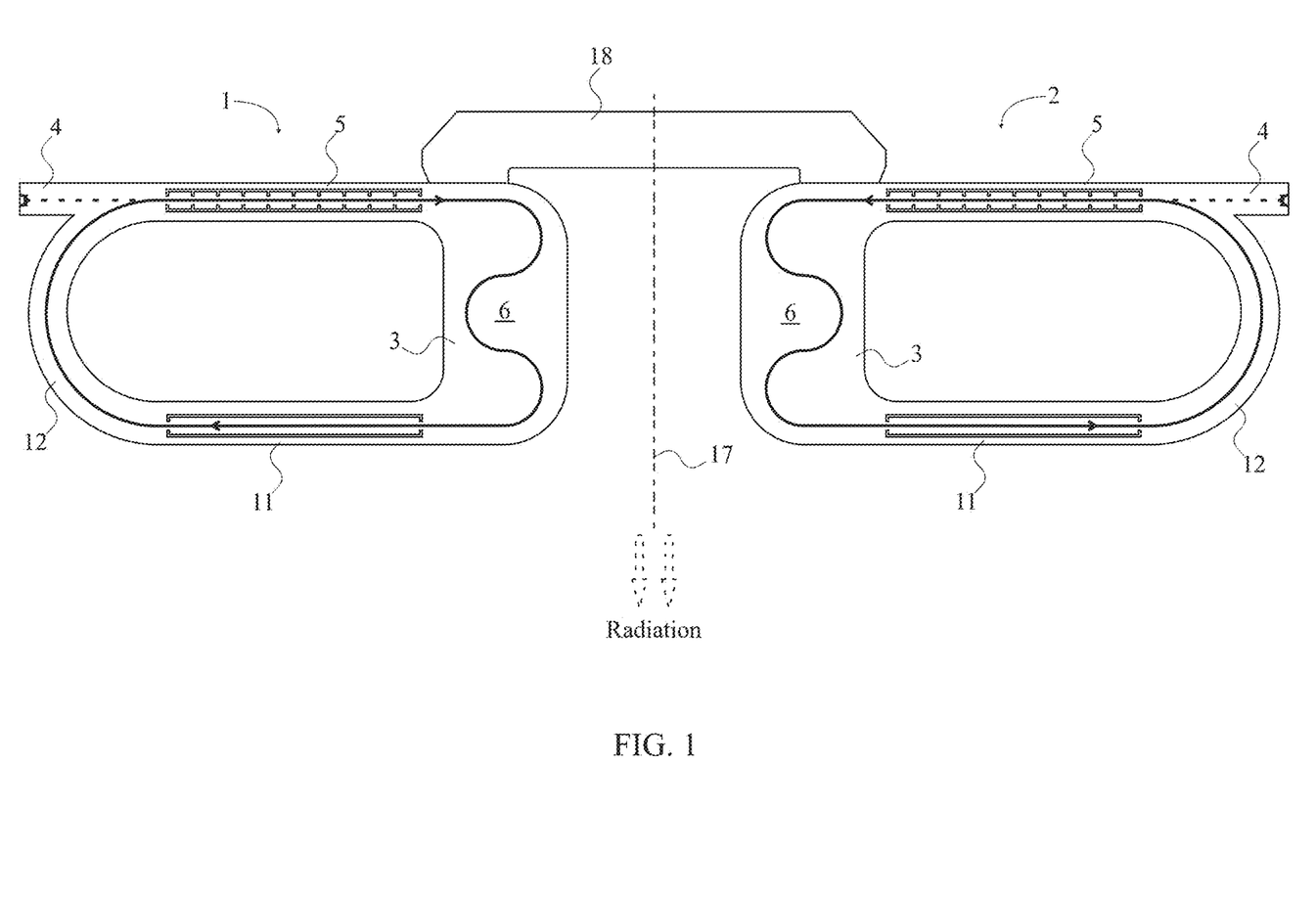
FIG. 1 is a schematic view showing the electron propulsion engine of the present invention.
Figure 2:
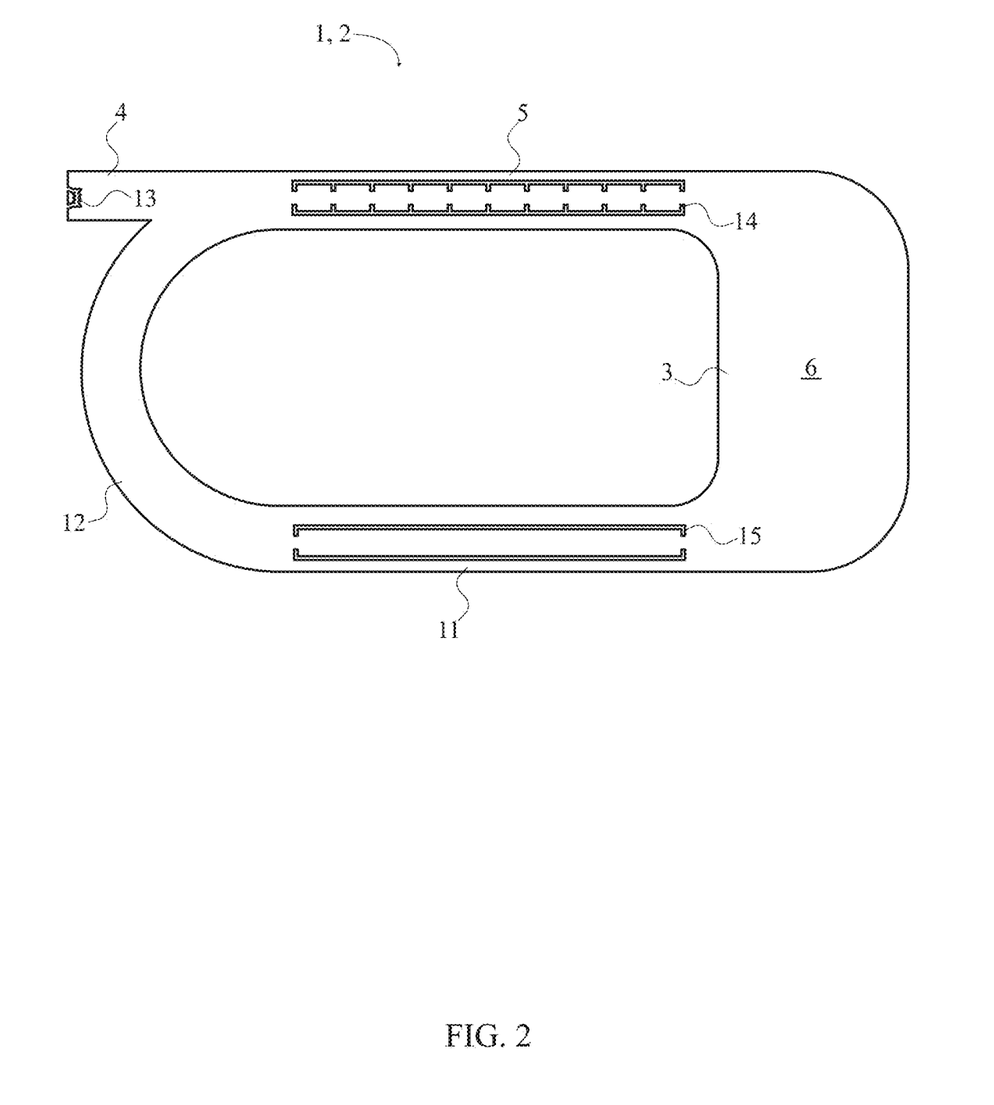
FIG. 2 is a schematic view showing the vacuum housing of an engine module of the electron propulsion engine of the present invention.
Figure 3:
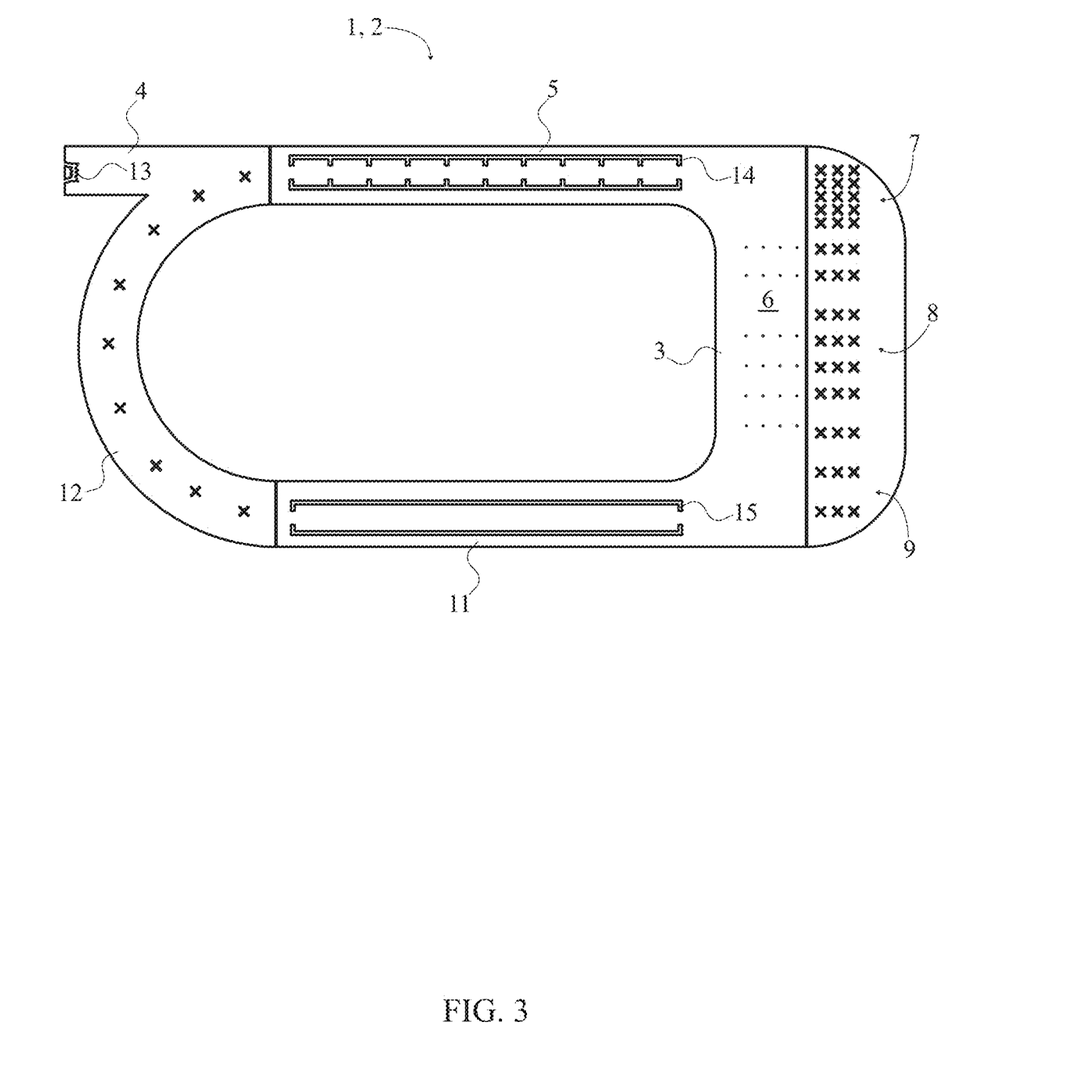
FIG. 3 is a schematic view showing the vacuum housing of an engine module of the electron propulsion engine of the present invention, wherein a first magnetic field distribution for turning the electron beam pulse is shown.
Figure 4:
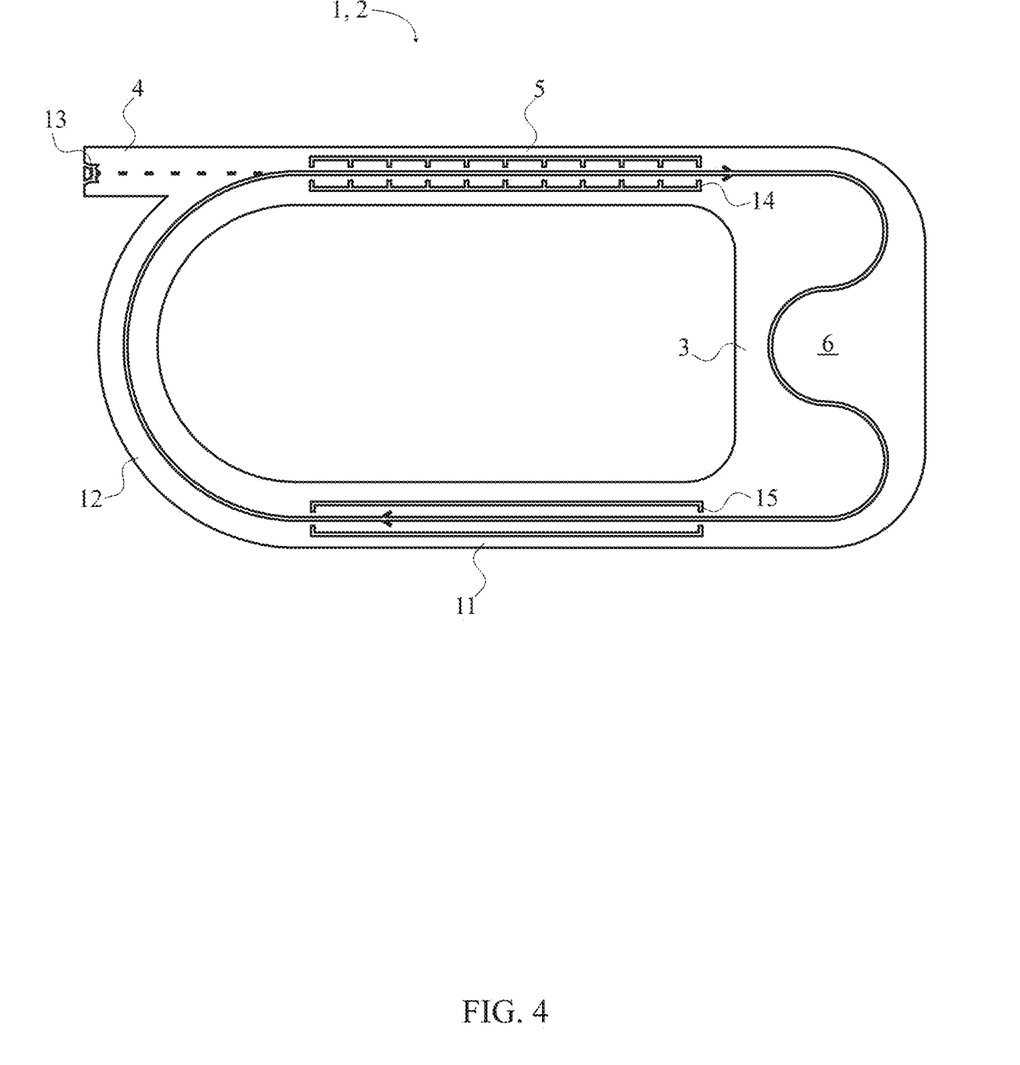
FIG. 4 is a schematic view showing the vacuum housing of an engine module of the electron propulsion engine of the present invention, wherein the electron beam path resulting from the first magnetic field distribution is shown.
Figure 5:
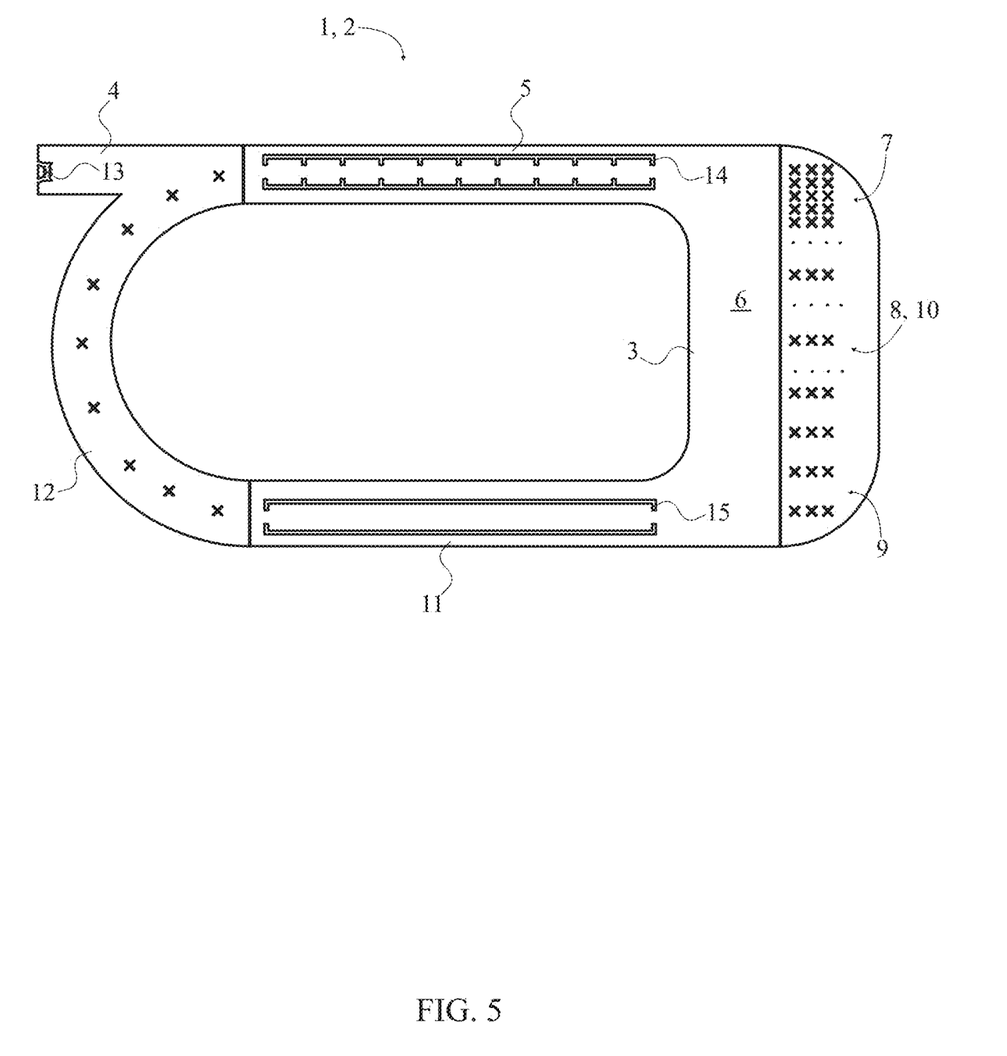
FIG. 5 is a schematic view showing the vacuum housing of an engine module of the electron propulsion engine of the present invention, wherein a second magnetic field distribution for turning the electron beam pulse is shown.
Figure 6:
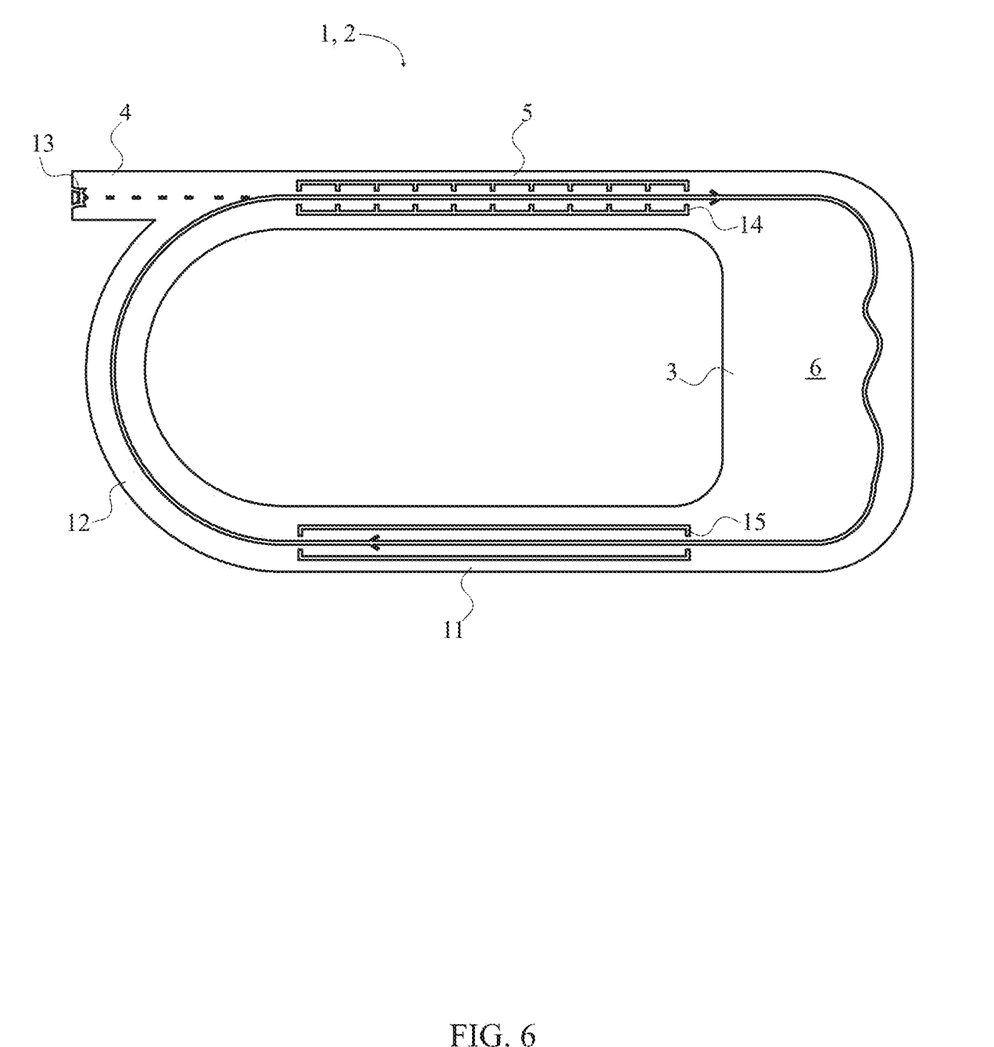
FIG. 6 is a schematic view showing the vacuum housing of an engine module of the electron propulsion engine of the present invention, wherein the electron beam path resulting from the second magnetic field distribution is shown.

As previously discussed, the first engine module 1 and the second engine module 2 are two mirror structures that propel the spacecraft using electromagnetic radiation. As can be seen in FIG. 1, the present invention may further comprise a mirror axis 17 corresponding to an arbitrary axis along which the two engine modules are mirrored. So, the first engine module 1 and the second engine module 2 each are positioned equidistant from the mirror axis 17. In addition, the vacuum housing 3 of the second engine module 2 is vertically symmetric to the vacuum housing 3 of the first engine module 1 across the mirror axis 17. Thus, a symmetrical engine structure is formed. The mirror configuration of the first engine module 1 and the second engine module 2 is designed to counter the torque generated by the radiation emitted by each engine module.

The mirror configuration of the electron propulsion engine can be achieved using the structure of the spacecraft equipped with the present invention. However, special mechanisms can be implemented to achieve the desired mirror configuration. As can be seen in FIG. 1, the present invention may further comprise a bridge connector 18 that positions the first engine module 1 and the second engine module 2 in a mirror configuration. For example, the bridge connector 18 can be an elongated structure large enough to offset the first engine module 1 from the second engine module 2 at a predetermined distance. In addition, the first straight section 5 of the first engine module 1 is preferably connected to the first straight section 5 of the second engine module 2 by the bridge connector 18. The bridge connector 18 offsets the first engine module 1 and the second engine module 2 from each other to form an outlet through which the emitted radiation escapes the spacecraft. The direction of the radiation output is arranged to be opposite to the direction the spacecraft is propelled towards to. In other embodiments, different structures or mechanisms can be utilized to form the mirror configuration of the electron propulsion engine.

As previously discussed, each engine module is designed to emit radiation through the radiation-emission section 6. As can be seen in FIG. 1 through 6, each first straight section 5, each second straight section 11, and each electron-return section 12 are made from radiation-blocking material. This way, the radiation emission resulting from the accelerated electron beam does not leak through the first straight section 5, the second straight section 11, nor the electron-return section 12. Further, each radiation-emission section 6 is made from radiation-conductive material so that the emitted radiation from the accelerated electron beam only escapes the vacuum housing 3 through the corresponding radiation-emission section 6.

As can be seen in FIG. 1 through 6, the electron inlet 4 allows the injection of electron pulses into the corresponding vacuum housing 3. In some embodiments, the present invention can be equipped with the necessary mechanisms to facilitate the continuous flow of negatively charged particles through each vacuum housing 3. So, the first engine module 1 and the second engine module 2 may each comprise an electron gun 13 that facilitates the injection of electron pulses into the corresponding vacuum housing 3. The electron gun 13 is preferably mounted within the corresponding electron inlet 4 to secure the electron gun 13 to the corresponding vacuum housing 3. Further, each electron gun 13 is electrically and electronically connected to the engine control system 16 so that the operation of the electron gun 13 is monitored by the engine control system 16.

As can be seen in FIG. 1 through 6, to facilitate the acceleration of the electron beam along the first straight section 5, the first engine module 1 and the second engine module 2 may each further comprise an electron accelerator 14. The electron accelerator 14 is designed to accelerate the electron beam to a predetermined speed necessary for the emission of radiation that can be used to propel the spacecraft. For example, the electron accelerator 14 can be an electromagnetic accelerator that increases the speed of the electron beam from the electron-return section 12 to the radiation-emission section 6. To do so, the electron accelerator 14 is mounted within the corresponding first straight section 5. This way, the electron accelerator 14 is secured within the corresponding vacuum housing 3. Further, each electron accelerator 14 is electrically and electronically connected to the engine control system 16 so that the operation of the electron accelerator 14 can be controlled by the engine control system 16.

Similarly, to facilitate the deceleration of the electron beam along the second straight section 11, the first engine module 1 and the second engine module 2 may each further comprise an electron decelerator 15, as can be seen in FIG. 1 through 6. The electron decelerator 15 is designed to decelerate the electron beam to a predetermined speed necessary to facilitate the recycling of the electron beam traveling through the vacuum housing 3. For example, the electron decelerator 15 can be an electromagnetic decelerator that reduces the speed of the electron beam from the radiation-emission section 6 to the electron-return section 12. To do so, the electron decelerator 15 is mounted within the corresponding second straight section 11. This way, the electron decelerator 15 is secured within the corresponding vacuum housing 3. Further, each electron decelerator 15 is electrically and electronically connected to the engine control system 16 so that the operation of the electron decelerator 15 can be controlled by the engine control system 16.

As can be seen in FIG. 1 through 6, the overall design of each vacuum housing 3 enables the corresponding engine module to operate as follows: electron pulses are injected into each vacuum housing 3 through the electron inlet 4. Then, the electron beam is accelerated along the first straight section 5 until the accelerated electron beams reaches the radiation-emission section 6. As the accelerated beam passes through the radiation-emission section 6, radiation is emitted, and the electron beam loses momentum. Then, once the electron beam reaches the second straight section 11, the electron beam is further decelerated until reaching the electron-return section 12. The electron-return section 12 is preferably arc-shaped with a size large enough to facilitate the move back towards the first straight section 5 without much electron lose so that the process can start again. This way, a continuous loop can be achieved to generated the necessary thrust to propel the spacecraft towards the desired direction. Furthermore, due to the mirror configuration of the first engine module 1 and the second engine module 2, the angular momentum resulting from the radiation emission from each engine module is canceled by each other. Thus, the only change in momentum results in the direction along which the spacecraft is to be propelled.

The D-shaped design of each vacuum housing 3 allows for the emission of radiation due to the acceleration of the electron beam. As can be seen in FIG. 1 through 6, the plurality of electromagnets implemented in each vacuum housing 3 are arranged in such a way that the North region of the generated electromagnetic field coincides with each electron-return section 12. On the other hand, the South region of the electromagnetic field coincides with each radiation-emission section 6. In addition, the radiation-emission section 6 is designed to ensure that the accelerated electron beam efficiently emits the required radiation to propel the corresponding spacecraft. The radiation-emission section 6 is designed to prolong the passage of the accelerate electron beam through the radiation-emission section 6. To do so, the radiation-emission section 6 of the first engine module 1 and the radiation-emission section 6 of the second engine module 2 may each further comprise a high magnetic field intensity (Hi-MFI) area 7, a middle magnetic field intensity (Mi-MFI) area 8, and a low magnetic field intensity (Lo-MFI) area 9. Several electromagnets can be arranged along the radiation-emission section 6 to enable the generation of each MFI area. In the preferred embodiment, the Hi-MFI area 7 is positioned adjacent to the first straight section 5 while the Lo-MFI area 9 is positioned adjacent to the second straight section 11. Furthermore, the Mi-MFI area 8 is positioned in between the Hi-MFI area 7 and the Lo-MFI area 9.

As can be seen in FIG. 1 through 6, the arrangement of the MFI areas along the radiation-emission section 6 is important to the operation of the electron propulsion engine. As the accelerated electron beam horizontally enters the Hi-MFI area 7, the electron beam turns left towards the radiation-emission section 6 because of the Lawrence force. If the magnetic field intensity is uniform, the electron beam travel path is likely a spiral line. So, to get a roughly round track, the magnetic field strength must be rolling weaker to compensate electron beam speed drop due to electromagnetic radiation emission. Given the speed of the electron beam at the end of the first straight section 5, the magnetic field intensity must be reduced gradually along the radiation-emission section 6. Further, the magnetic field must be adjusted so that when the electron beam crosses to the inverted magnetic field area within the radiation-emission section 6, the electron beam direction is horizontal left or horizontal left-down.

At the inverted magnetic field area within the radiation-emission section 6, the inverted magnetic field intensity is also reduced gradually so that when electron beam crosses back to the non-inverted area, the electron beam direction is horizontal right or horizontal right-down, as can be seen in FIG. 1 through 6. This left-right pattern can be repeated if the working conditions allow. The goal is to conduct the electron beam to perform a circular acceleration as many times as possible while traveling along the radiation-emission section 6. The electron beam also slows down due to the radiation emission while moving through the radiation-emission section 6. In addition, the electron beam preferably swings slightly while traveling down.

In an alternate embodiment, the radiation-emission section 6 of the first engine module 1 and the radiation-emission section 6 of the second engine module 2 each further comprise an undulator 10, as can be seen in FIG. 1 through 6. The undulator 10 helps oscillate the electron beam travelling through the radiation-emission section 6. To do so, the undulator 10 is positioned adjacent to the Mi-MFI area 8 and mounted within the corresponding radiation-emission section 6 to secure the undulator 10 within the corresponding vacuum housing 3. Regardless, at the end of the radiation-emission section 6, the electron beam travels horizontally by the magnetic field coinciding with the Lo-MFI area 9. Once the electron beam enters the second straight section 11, the electron beam is on the return path and any radiation emission is discouraged. If the electron decelerator 15 is implemented, the electron decelerator 15 can convert kinetic energy of the electron beam into electrical energy for the electron propulsion engine and/or the corresponding spacecraft.

After passing the second straight section 11, the decelerated electron beam is forced to return to the first straight section 5 via the electron-return section 12. In the preferred embodiment, the electron-return section 12 is preferably an arc-shaped section that serves as a recycling curve path, as can be seen in FIG. 1 through 6. To minimize the radiation emission losses, the curve radius of the electron-return section 12 is designed to be as large as possible. Further, as the electron beam reaches the first straight section 5, the travel direction of the electron beam needs to be horizontal. To do so, the magnetic field distribution in the electron-return section 12 is a weak MFI area to achieve this condition. Then, as the electron beam enters the first straight section 5 again, a new cycle starts to propel the spacecraft continuously.

Figure 7:
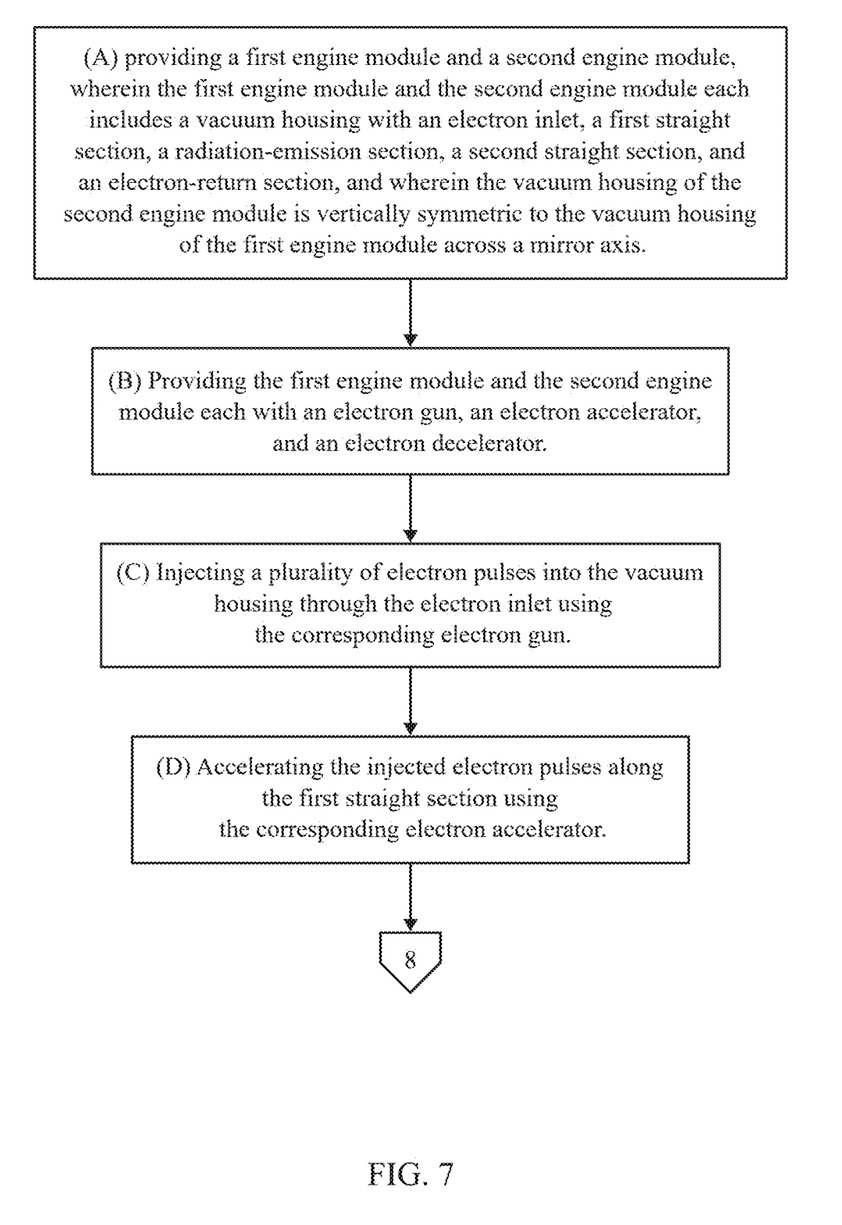
FIG. 7 is a flowchart showing the overall process of the method of operation of the electron propulsion engine of the present invention.
Figure 8:
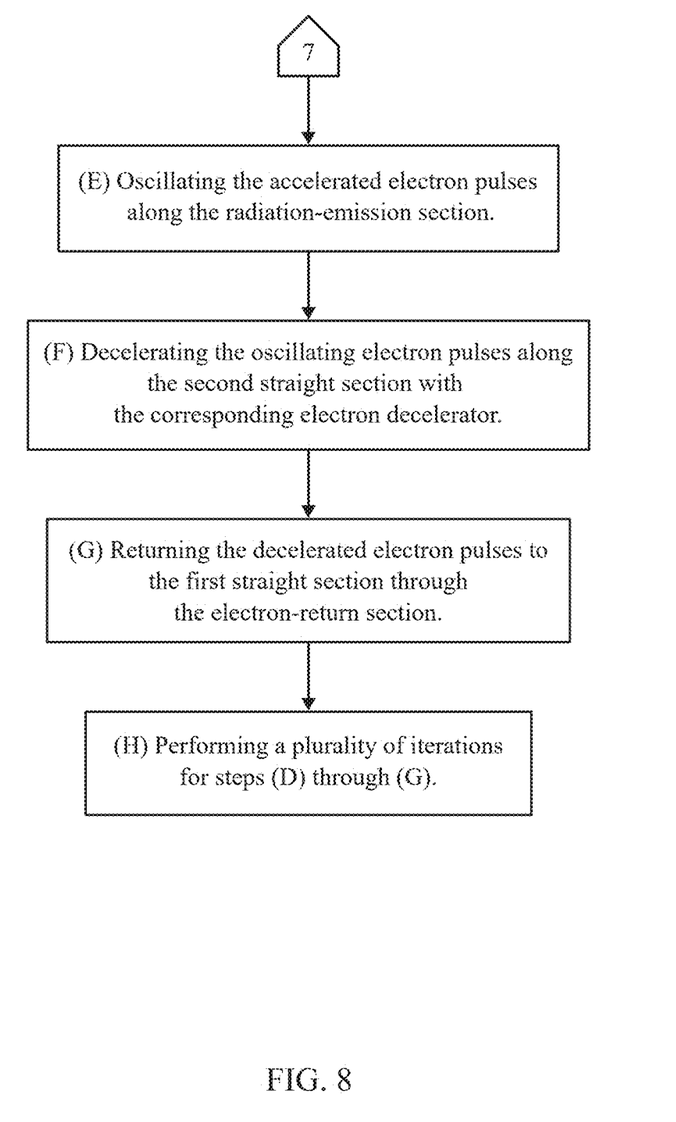
FIG. 8 is a flowchart showing the continuation of the overall process of the method shown in FIG. 7.

As can be seen in FIGS. 7 and 8, the electron propulsion engine of the present invention can be implemented with a preferred method of operation that allows for the efficient propulsion of the corresponding spacecraft. In general, the method of the present invention can be implemented using the first engine module 1 and the second engine module 2 (Step A). The first engine module 1 and the second engine module 2 each includes the vacuum housing 3 with an electron inlet 4, a first straight section 5, a radiation-emission section 6, a second straight section 11, and an electron-return section 12. Further, the vacuum housing 3 of the second engine module 2 is vertically symmetric to the vacuum housing 3 of the first engine module 1 across a mirror axis 17. Furthermore, the first engine module 1 and the second engine module 2 each includes the electron gun 13, the electron accelerator 14, and the electron decelerator 15 (Step B). These essential components enables the implementation of the method of the present invention.

As can be seen in FIGS. 7 and 8, the overall process of the method of the present invention begins by injecting a plurality of electron pulses into the vacuum housing 3 through the electron inlet 4 using the corresponding electron gun 13 (Step C). When the electron propulsion engine is started, electron pulses need to be injected to start the process of emitting radiation for propulsion of the spacecraft. Then, the injected electron pulses are accelerated along the first straight section 5 using the corresponding electron accelerator 14 (Step D), which facilitates the emission of the necessary radiation. Once the electron beam from the first straight section 5 reaches the radiation-emission section 6, the accelerated electron pulses are oscillated along the radiation-emission section 6 (Step E). This allows the emission of radiation along the radiation-emission section 6. Moreover, after the electron beam leaves the radiation-emission section 6, the oscillating electron pulses are decelerated along the second straight section 11 with the corresponding electron decelerator 15 (Step F). The electron beam decelerates along the second straight section 11 until reaching the electron-return section 12. Afterwards, the decelerated electron pulses are returned to the first straight section 5 through the electron-return section 12 (Step G) so that the process can be repeated to continuously propel the spacecraft. So, a plurality of iterations are performed for Steps D through G (Step H) to continuously propel the spacecraft.

Figure 9:
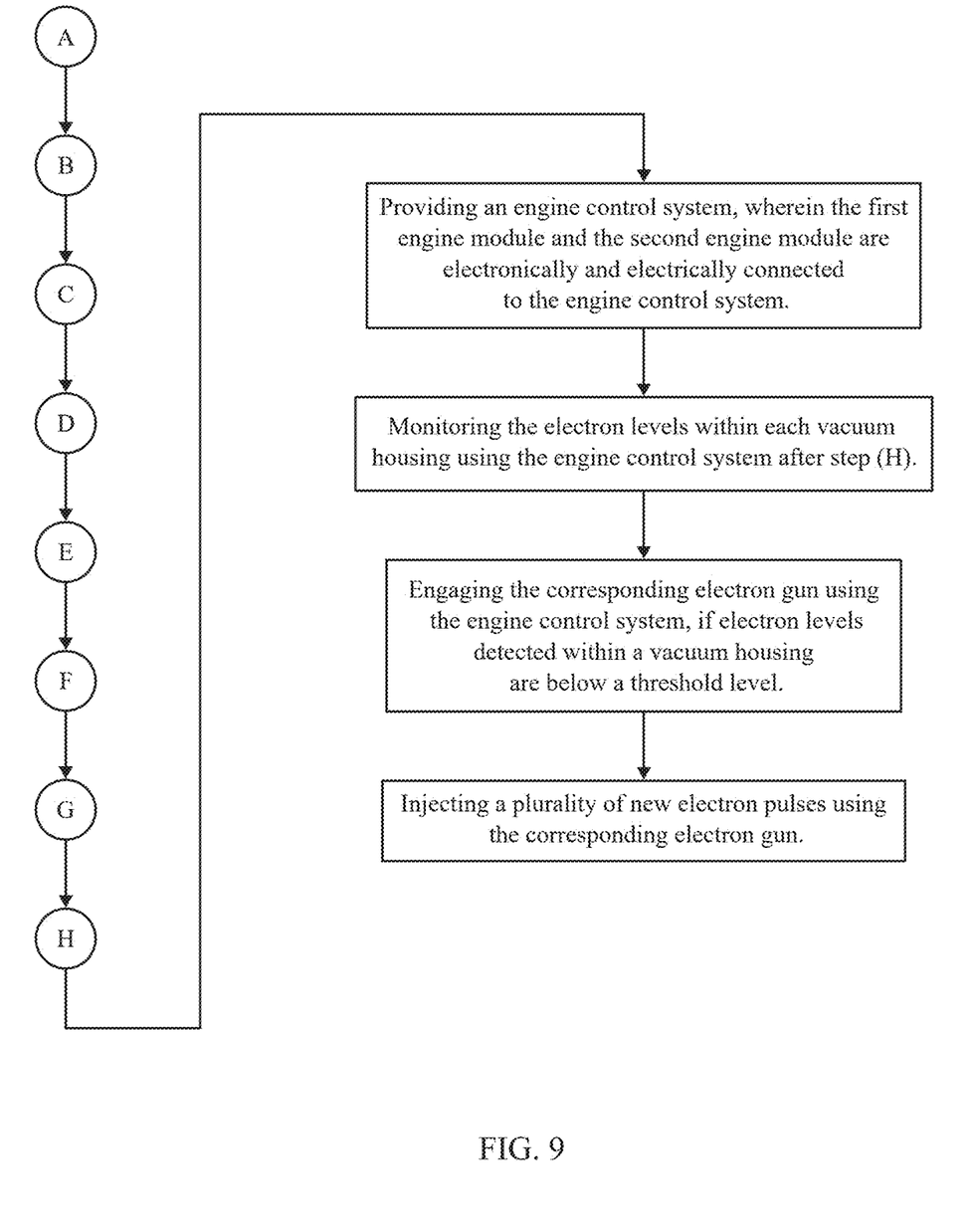
FIG. 9 is a flowchart showing the subprocess of controlling the electron levels in the vacuum housing of an engine module of the present invention.

During each cycle, electrons can be lost due to collisions between the electrons and the walls of the vacuum housing 3. The electron loss is discouraged, but inevitable. So, to compensate electron losses during each cycle, the engine control system 16 is configured to monitor the levels of the electrons present within each vacuum housing 3. As can be seen in FIG. 9, the subprocess of controlling the electron levels in each vacuum housing 3 includes the steps of monitoring the electron levels within each vacuum housing 3 using the engine control system 16 after Step H. Specialized sensors and methodologies can be used to analyze the electron levels present at each vacuum housing 3. Further, the corresponding electron gun 13 is engaged using the engine control system 16, if electron levels detected within a vacuum housing 3 are below a threshold level. The threshold level is predetermined according to the design of the electron propulsion engine, and the engine control system 16 can be implemented to operate according to the predetermined settings. Thus, only if the electron levels fall below the threshold level a plurality of new electron pulses is injected using the corresponding electron gun 13. The electron gun 13 injects electron beam pulses into the returning electron beam after every cycle. Further, the electron gun 13 does not perform continuous injection, only into the returning electron beam. Furthermore, the detection of the real-time position of the electron beam is critical to the present invention.

Although the invention has been explained in relation to its preferred embodiment, it is to be understood that many other possible modifications and variations can be made without departing from the spirit and scope of the invention.

What is claimed is:
1. An electron propulsion engine comprising:
   a first engine module;
   a second engine module;
   an engine control system;
   the first engine module and the second engine module each comprising a vacuum housing;
   the vacuum housing comprising an electron inlet, a first straight section, a radiation-emission section, a second straight section, and an electron-return section;
   the vacuum housing of the first engine module and the vacuum housing of the second engine section being positioned coplanar and offset to each other;
   the first straight section and the second straight section being positioned parallel and offset to each other;
   the radiation-emission section being terminally connected in between the first straight section and the second straight section;
   the electron-return section being terminally connected in between the first straight section and the second straight section, opposite the radiation-emission section;
   the electron inlet being terminally integrated into the first straight section, adjacent to the electron-return section;
   the radiation-emission section of the first engine module being positioned adjacent to the radiation-emission section of the second engine module;
   the engine control system being positioned external to the first engine module and the second engine module; and
   the first engine module and the second engine module being electrically and electronically connected to the engine control system.

2. The electron propulsion engine as claimed in claim 1 further comprising:
   a mirror axis;
   the first engine module and the second engine module each being positioned equidistant from the mirror axis; and the vacuum housing of the second engine module being vertically symmetric to the vacuum housing of the first engine module across the mirror axis.

3. The electron propulsion engine as claimed in claim 1 further comprising:
a bridge connector; and
the first straight section of the first engine module being connected to the first straight section of the second engine module by the bridge connector.

4. The electron propulsion engine as claimed in claim 1, wherein each first straight section, each second straight section, and each electron-return section are made from radiation-blocking material.

5. The electron propulsion engine as claimed in claim 1, wherein each radiation-emission section is made from radiation-conductive material.

6. The electron propulsion engine as claimed in claim 1 further comprising:
the first engine module and the second engine module each comprising an electron gun;
the electron gun being mounted within the corresponding electron inlet; and
each electron gun being electrically and electronically connected to the engine control system.

7. The electron propulsion engine as claimed in claim 1 further comprising:
the first engine module and the second engine module each comprising an electron accelerator;
the electron accelerator being mounted within the corresponding first straight section; and
each electron accelerator being electrically and electronically connected to the engine control system.

8. The electron propulsion engine as claimed in claim 1 further comprising:
the first engine module and the second engine module each comprising an electron decelerator;
the electron decelerator being mounted within the corresponding second straight section; and
each electron decelerator being electrically and electronically connected to the engine control system.

9. The electron propulsion engine as claimed in claim 1 further comprising:
the radiation-emission section of the first engine module and the radiation-emission section of the second engine module each comprising a high magnetic field intensity (Hi-MFI) area, a middle magnetic field intensity (Mi-MFI) area, and a low magnetic field intensity (Lo-MFI) area;
the Hi-MFI area being positioned adjacent to the first straight section;
the Lo-MFI area being positioned adjacent to the second straight section; and
the Mi-MFI area being positioned in between the Hi-MFI area and the Lo-MFI area.

10. The electron propulsion engine as claimed in claim 9 further comprising:
the radiation-emission section of the first engine module and the radiation-emission section of the second engine module each further comprising an undulator;
the undulator being positioned adjacent to the Mi-MFI area; and
the undulator being mounted within the corresponding radiation-emission section.

11. The electron propulsion engine as claimed in claim 1, wherein each electron-return section is an arc-shaped section.

12. The electron propulsion engine as claimed in claim 1, wherein each electron-return section is a weak MFI area.

13. A method of operating an electron propulsion engine, the method comprising the steps of:
(A) providing a first engine module and a second engine module, wherein the first engine module and the second engine module each includes a vacuum housing with an electron inlet, a first straight section, a radiation-emission section, a second straight section, and an electron-return section, and wherein the vacuum housing of the second engine module is vertically symmetric to the vacuum housing of the first engine module across a mirror axis;
(B) providing the first engine module and the second engine module each with an electron gun, an electron accelerator, and an electron decelerator;
(C) injecting a plurality of electron pulses into the vacuum housing through the electron inlet using the corresponding electron gun;
(D) accelerating the injected electron pulses along the first straight section using the corresponding electron accelerator;
(E) oscillating the accelerated electron pulses along the radiation-emission section;
(F) decelerating the oscillating electron pulses along the second straight section with the corresponding electron decelerator;
(G) returning the decelerated electron pulses to the first straight section through the electron-return section; and
(H) performing a plurality of iterations for steps (D) through (G).

14. The method as claimed in claim 13 further comprising the steps of:
providing an engine control system, wherein the first engine module and the second engine module are electronically and electrically connected to the engine control system;
monitoring the electron levels within each vacuum housing using the engine control system after step (H);
engaging the corresponding electron gun using the engine control system, if electron levels detected within a vacuum housing are below a threshold level; and
injecting a plurality of new electron pulses using the corresponding electron gun.

* * * * *